United States Patent [19]

Spiers et al.

[11] Patent Number: 5,789,092
[45] Date of Patent: Aug. 4, 1998

[54] METHOD AND EQUIPMENT FOR PREVENTION OF COOLING OF ELECTROCHEMICAL DEVICES

[75] Inventors: David John Spiers, Oxon, Great Britain; Jyrki Rainer Leppanen, Helsinki, Finland

[73] Assignee: Neste Oy, Espoo, Finland

[21] Appl. No.: 676,108

[22] PCT Filed: Dec. 29, 1994

[86] PCT No.: PCT/FI94/00587

§ 371 Date: Jun. 27, 1996

§ 102(e) Date: Jun. 27, 1996

[87] PCT Pub. No.: WO95/18469

PCT Pub. Date: Jul. 6, 1995

[30] Foreign Application Priority Data

Dec. 30, 1993 [FI] Finland ................... 935936

[51] Int. Cl.[6] ................... H01M 10/50
[52] U.S. Cl. ................... 429/24; 429/62
[58] Field of Search ................... 429/24, 26, 62

[56] References Cited

U.S. PATENT DOCUMENTS

| | | | |
|---|---|---|---|
| 2,516,048 | 7/1950 | Endress | 429/62 |
| 3,512,071 | 5/1970 | Daniels | 320/5 |
| 5,200,278 | 4/1993 | Watkins et al. | 429/24 |
| 5,302,471 | 4/1994 | Ito et al. | 429/24 |

FOREIGN PATENT DOCUMENTS

| | | |
|---|---|---|
| 1496128 | 4/1963 | Germany . |
| 1496346 | 12/1965 | Germany . |
| 2148627 | 9/1971 | Germany . |
| 2643903 | 9/1976 | Germany . |

OTHER PUBLICATIONS

Patent Abstracts of Japan, vol. 12, No. 328 (E–624), Abstract of Published Japanese Patent Application No. 63–91967, Apr. 1988.

Patent Abstracts of Japan, vol. 10, No. 16 (E–375), Abstract of Published Japanese Patent Application No. 60–177568, Sep. 1985.

Patent Abstracts of Japan, vol. 9, No. 81(E–307), Abstract of Published Japanese Patent Application No. 59–214166, Dec. 1984.

*Primary Examiner*—Stephen Kalafut
*Attorney, Agent, or Firm*—Steinberg & Raskin, P.C.

[57] ABSTRACT

The invention concerns a method and an equipment for prevention of cooling of electrochemical devices (10). The temperature of the electrochemical device (10) is measured and, as the temperature falls below a certain preset lower limit ($T_{minimum}$), an additional load (17), which is at least high enough so that the electric current that it produces heats the electrochemical device (10), is connected to the device. The additional load (17) is disconnected from the electrochemical device (10) as the temperature has reached a certain preset upper limit ($T_{maximum}$).

6 Claims, 2 Drawing Sheets

METHOD AND EQUIPMENT FOR PREVENTION OF COOLING OF ELECTROCHEMICAL DEVICES

FIELD OF THE INVENTION

The invention concerns a method for prevention of cooling of electrochemical devices.

The invention also concerns an equipment for prevention of cooling of electrochemical devices.

BACKGROUND OF THE INVENTION

Cold climatic conditions cause danger of freezing to electrochemical devices, such as, for example, fuel cells. As is well known, it is possible to use fuel cells connected to a hydrogen storage to produce electric energy in sparsely inhabited regions. Normally, as the fuel cell is in operation, the waste heat which develops in the fuel cells is enough to keep the fuel cell sufficiently warm. However, if the loading is too low to keep the fuel cell sufficiently warm or the fuel cell is not in operation and, thus, is not connected to loading, freezing of the fuel cell can take place. Malfunction in the system may also cause freezing of the fuel cell.

The most problematic freezing takes place in fuel cells of the solid-polymer electrolyte type. An excessively low temperature may also cause difficulties or at least slowness in the starting in other kinds of fuel cells such as, for example, alkali-type, phosphoric-acid type, etc. In solid-polymer type fuel cells the key component is a membrane which conducts protons, which membrane contains mainly water. If the water in the membrane freezes, it prevents the conducting of the protons in the membrane, and the fuel cell cannot operate. Freezing can also permanently damage the structure of the fuel cell by causing mechanical strain on the cell.

Solidification or weakening of the operation at temperatures lower than a normal temperature are also a problem in fuel cells which operate at higher temperatures.

As regards the prior art, reference is made to the publication JP-59-214166, in which publication an outside electric heater is suggested which heats nitrogen gas. By means of this, freezing of phosphoric acid is prevented in phosphoric-acid type fuel cells.

OBJECTS AND SUMMARY OF THE INVENTION

The object of the invention is to provide an improvement over the prior-art solutions. A more specific object of the invention is to provide a method and an equipment by means of which it is possible to reliably prevent harmful cooling of electrochemical devices.

The method in accordance with the invention is characterized in that the temperature of the electrochemical device is measured and, as the temperature falls below a certain pre-set lower limit, an additional load is connected to the device (in parallel with the existing load) which additional load is at least high enough to cause an electric current which heats the electrochemical device, and that said additional load is disconnected from the electrochemical device as the temperature has reached a certain pre-chosen upper limit.

The equipment in accordance with the invention is characterized in that the equipment includes a control member, which measures the temperature and carries out the switching-on at a certain low temperature of the load into the circuit and the switching-off at a certain high temperature, and a member which loads the electrochemical device, which loading member is, by the effect of said control member, switched on at a certain low temperature and causes an increase in electric current which flows through the electrochemical device and heats it, and which loading member is, by the effect of said control member, disconnected at said high temperature to switch off the electric current which heats the electrochemical device.

In the solution in accordance with the invention, the temperature of the electrochemical device, for example a fuel cell, is measured, and as the temperature falls below a certain pre-chosen lower limit $T_{minimum}$, the additional loading is connected in parallel with the existing load, e.g., the internal resistance of the fuel cell. As the additional loading is connected, the electric current starts to circulate through the circuit which consists of the additional loading and of the inner resistance in the fuel cell. The electric current flowing through the fuel cell then heats the fuel cell, and its temperature starts rising. At the same time, the increased loading automatically produces an increase in the function level of the fuel cell and an increase in the heat generation. The additional loading is disconnected as the temperature of the electrochemical device rises and reaches a certain pre-chosen upper limit $T_{maximum}$. The waste heat that is formed in the additional load itself can also be used for heating the cell battery by, for example, attaching the additional load concerned near or, for example, even to the cell battery of the fuel cell. It is recommended to measure the temperature from the coldest spot of the set of plates in the fuel cell, for example, from the edge of the set of plates and favourably from the end plate of the cell battery. The temperature can also be measured from inside the cell battery.

The preset lower limit of the temperature $T_{minimum}$ is chosen depending on the kind of electrochemical device that produces electricity that is concerned and on the sort of electrode structure and electrolyte that are used in each case. In all of the cases, the chosen $T_{minimum}$ is higher than the freezing temperature or the solidification temperature of the electrolyte concerned, because freezing or solidification of the electrolyte causes mechanical strains which can be harmful for the fuel cell, and the fuel cell does not start at all when the electrolyte is solid. However, in different types of fuel cells, the normal ranges of operating temperature differ greatly. An electrolyte which contains water is used, for example, in solid-polymer fuel cells (SPFC) and in alkaline fuel cells, in which the range of operating temperature is usually 50°–80° C. Other fuel cell types are solid-oxide type fuel cells (SOFC), whose operating temperature is of an order of 1000° C., molten-carbonate type fuel cells (MCFC), whose operating temperature is 500°–600° C., and phosphoric-acid type fuel cells (PAFC), whose operating temperature is between 180°–300° C. The operation of the fuel cells deteriorates ever more as the temperature goes down further from the normal operating temperature, and correspondingly it takes longer to reach the normal operation. Thus, according to the invention, it is possible to choose the minimum temperature $T_{minimum}$ in each case at least so high that the fuel cell still operates at the temperature concerned and it is possible to use the mode of heating in accordance with the invention.

The maximum of the upper limit of temperature $T_{maximum}$ is, naturally, set by the highest permitted operating temperature of the fuel cell type concerned. However, it is advisable to choose the maximum temperature so that it is as close to the minimum temperature as possible in order to minimize the consumption of electricity. A suitable difference in temperature between the upper and lower limits can thus be, for example, 1°–20° C., but it can also be remarkably higher especially in the case of fuel cells that operate at higher temperatures.

It is possible to carry out the connecting and the disconnecting of the additional load in any manner known in the art. So it is possible to use a suitable current circuit which consists of one or more temperature detectors and an electric connector member for the purpose.

In its simplest form the additional load can consist of an ohmic resistor, which is connected in parallel with the fuel cell as its temperature falls under the minimum temperature and which is disconnected after the temperature has risen to the set upper temperature value. The resistance value of the resistor is then chosen so that the current flowing through it is not higher than the highest permitted value of the current flowing through the fuel cell.

In accordance with one embodiment of the invention, it is possible to choose the resistance value of the additional load so that it is very low, i.e. the resistance causes a remarkably high load on the fuel cell and thus causes a rapid rise of the temperature. In accordance with the invention, the additional loading can be so high that it causes a current which is too high, e.g. comparable to short circuit of the fuel cell or close to it. In such a case a current circuit is favourably added to the additional load, which circuit cuts the current at a certain frequency and adjusts the width of the pulse by adjusting the effective value of the current to the desired level. By means of pulse-width modulation, it is also possible to adjust the resistance which constitutes an additional load as an invariable-current load by changing the pulse width. Then the pulse width is proportional to the effective current.

BRIEF DESCRIPTION OF THE DRAWINGS

The invention will be described in detail with reference to some preferred embodiments of the invention illustrated in the figures in the accompanying drawing, the invention being, however, not supposed to be confined to said embodiments alone.

DETAILED DESCRIPTION OF THE INVENTION

Figure 1:
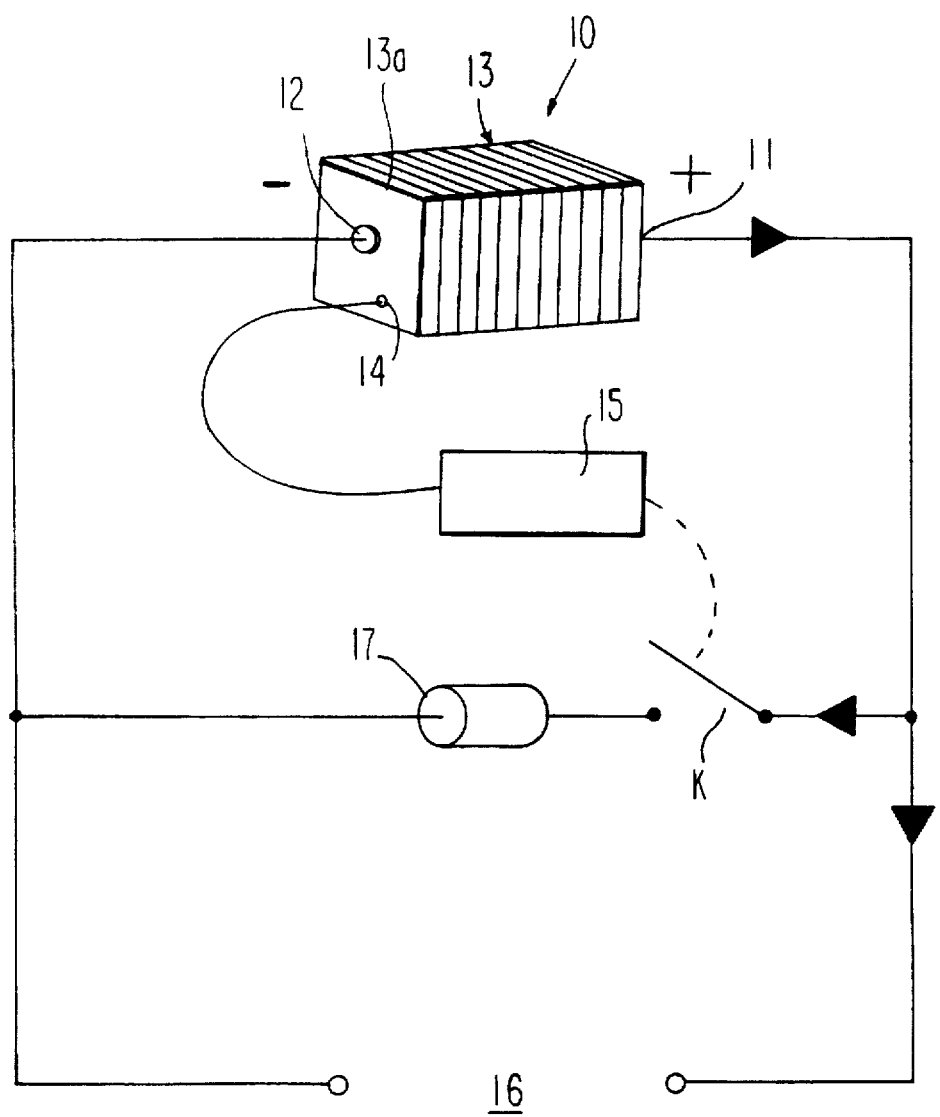
FIG. 1 shows schematically the wiring used in the method in accordance with the invention.

In FIG. 1 the electrochemical device is denoted generally with the reference numeral 10. In this embodiment, the electrochemical device is a fuel cell, whose positive pole is denoted with the reference numeral 11 and the negative pole with the reference numeral 12. The individual cells in the fuel cell are denoted with the reference numeral 13 and the end plate with the reference numeral 13a. The temperature measurement detector 14 is attached to the end plate 13a. The temperature indicator is denoted with the reference numeral 15. The loading of the electrochemical device 10 is denoted with the reference numeral 16.

As the temperature indicator 15 shows that the temperature has fallen below the pre-chosen lower limit at the point of time $t_0$, the connector K connects the additional load, which is the resistor 17 in this embodiment, to the current circuit, and then the total current is $I_{total} = I_{loading} + I_{adjustment}$.

Figure 2:
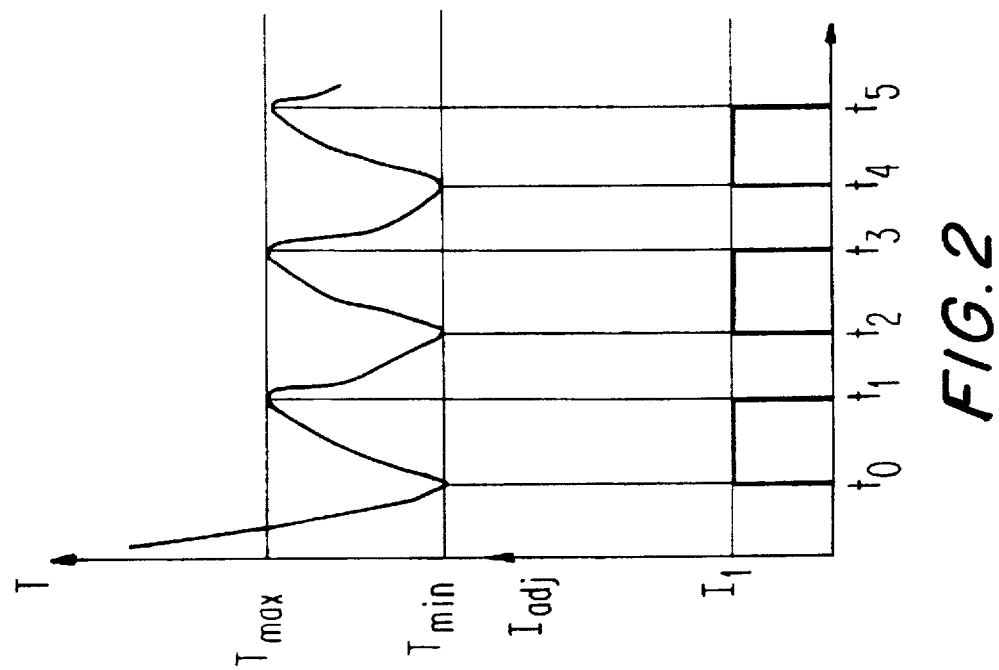
FIG. 2 shows graphically the supply of the current as a function of time used in the method in accordance with the invention.

The temperature of the fuel cell 10 rises in accordance with FIG. 2 and, as the temperature reaches the pre-chosen upper limit $T_{maximum}$ at the point of time $t_1$, the connector is disconnected.

In a preferred embodiment of the method in accordance with the invention, it is possible to replace the resistor 17 by invariable-current loading which is controlled by the temperature measurement circuit. The pre-chosen invariable-current loading is chosen so that, with a certain supposed minimum environment temperature $T_{minimum\ environment}$, for example $-10°$ C., the temperature of the set of plates in the fuel cell 10 never falls below a certain minimum level, for example $+4°$ C. This is a more accurate method and an easier solution than the simple resistance loading system described above, which is illustrated in FIG. 2 with respect to time $t_0$ to $t_5$. It is possible to adjust the invariable-current loading also as a function of the temperature of the environment, which must, however, not be measured too close to the heating resistor or the fuel cell.

Figure 3:
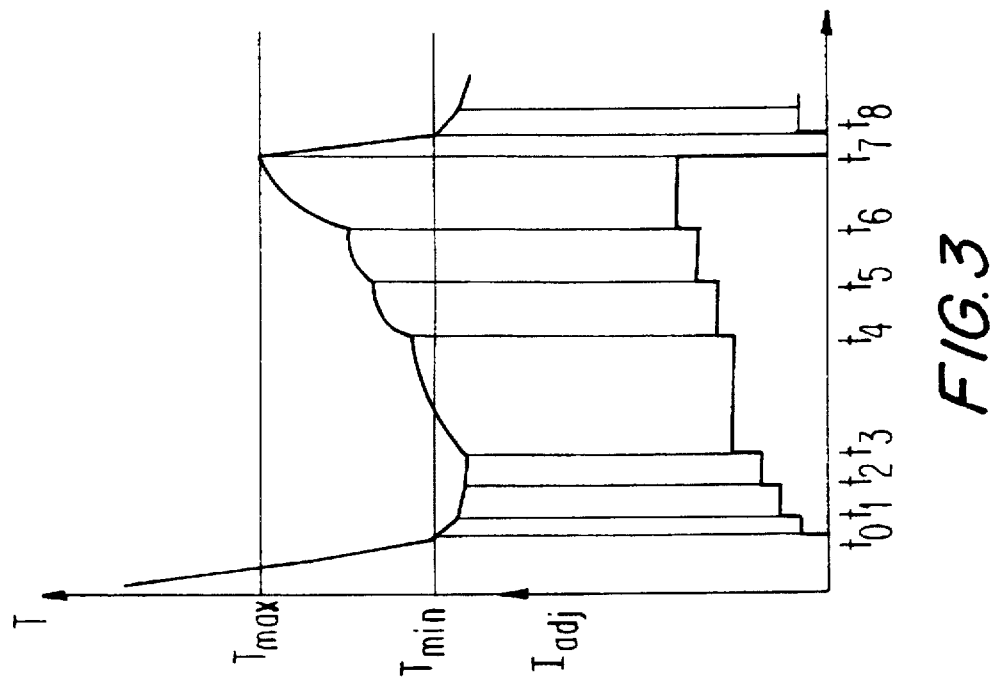
FIG. 3 shows graphically a mode of current supply as a function of time used in a second preferred embodiment of the method in accordance with the invention.

In a second preferred embodiment of the method in accordance with the invention, it is possible to adjust the invariable-current loading as a function of the change in temperature $\Delta T$ in the fuel cell. The change in temperature $\Delta T$ is produced by loading. This means that, as the temperature reaches the minimum level $T_{minimum}$, for example $+4°$ C., the invariable-current loading is switched on, for example, to the fuel cell with a certain minimum value. After that, the current I is increased at certain time intervals $\Delta t$, if the temperature T of the fuel cell has not increased enough or the temperature T has not increased at all, by a certain invariable amount dI until the upper limit $T_{maximum}$, for example $+7°$ C., has been reached or the speed of the change in temperature T is high enough, as is shown in FIG. 3 with respect to time $t_0$ to $t_8$.

Above, only some preferred embodiments of the invention have been described, and it is obvious to a person skilled in the art that it is possible to make numerous modifications to said embodiments within the scope of the inventive idea presented in the accompanying claims.

We claim:

1. A method for preventing the cooling of an electrochemical device below a predetermined lower limit the electrochemical device producing electricity and being electrically connected in a circuit to a first load, comprising the steps of:

measuring the temperature of the electrochemical device, if the temperature of the electrochemical device falls below the predetermined lower limit, connecting a second load in the circuit in parallel with the first load to increase the current provided by the electrochemical device, the second load being at least high enough so that the increased current provided by the electrochemical device when in circuit with the first and second loads heats the electrochemical device to exceed the predetermined lower limit, if the current provided by the electrochemical device is too high for operating of the electrochemical device without a short circuit, lowering the current provided by the electrochemical device by cutting the current which flows through the second load at intervals to provide the current with a pulse width and adjusting the pulse width until the current flowing through the second load is lowered to a level at which the electrochemical device can operate without a short circuit, and disconnecting the second load from the circuit when the temperature of the electrochemical device reaches a predetermined upper limit.

2. The method according to claim 1, further comprising the step of selecting the electric resistance of the second load to be lower than the first load.

3. A method for preventing the cooling of an electrochemical device below a predetermined lower limit, the electrochemical device producing electricity and being electrically connected in a circuit to a first load, comprising the steps of:

measuring the temperature of the electrochemical device, if the temperature of the electrochemical device falls below the predetermined lower limit, connecting a second load in the circuit in parallel with the first load to increase the current provided by the electrochemical device, the second load being at least high enough so that the increased current provided by the electrochemical device when in circuit with the first and second loads heats the electrochemical device to exceed the predetermined lower limit, adjusting the second load as a function of the ambient temperature, and disconnecting the second load from the circuit when the temperature of the electrochemical device reaches a predetermined upper limit.

4. A met hod for preventing the cooling of an electrochemical device below a predetermined lower limit, the electrochemical device producing electricity and being electrically connected in a circuit to a first load, comprising the steps of:

measuring the temperature of the electrochemical device, if the temperature of the electrochemical device falls below the predetermined lower limit, connecting a second load in the circuit in parallel with the first load to increase the current provided by the electrochemical device, the second load being at least high enough so that the increased current provided by the electrochemical device when in circuit with the first and second loads heats the electrochemical device to exceed the predetermined lower limit, adjusting the second load as a function of the change in temperature of the electrochemical device, and disconnecting the second load from the circuit when the temperature of the electrochemical device reaches a predetermined upper limit.

5. The method according to claim 4, wherein if the temperature of the electrochemical device has not increased a predetermined amount, the method further comprises the step of increasing the current provided by the electrochemical device at predetermined time intervals by a predetermined amount until the electrochemical device reaches a predetermined upper limit.

6. The method according to claim 4, wherein if the temperature of the electrochemical device has not increased a predetermined amount, the method further comprises the step of increasing the current provided by the electrochemical device at predetermined time intervals by a predetermined amount until the speed of the change in temperature reaches a predetermined upper limit.

* * * * *